(Model.)
A. M. MILLARD.
SWAMP AND GRAB HOOK.
No. 290,785.                    Patented Dec. 25, 1883.
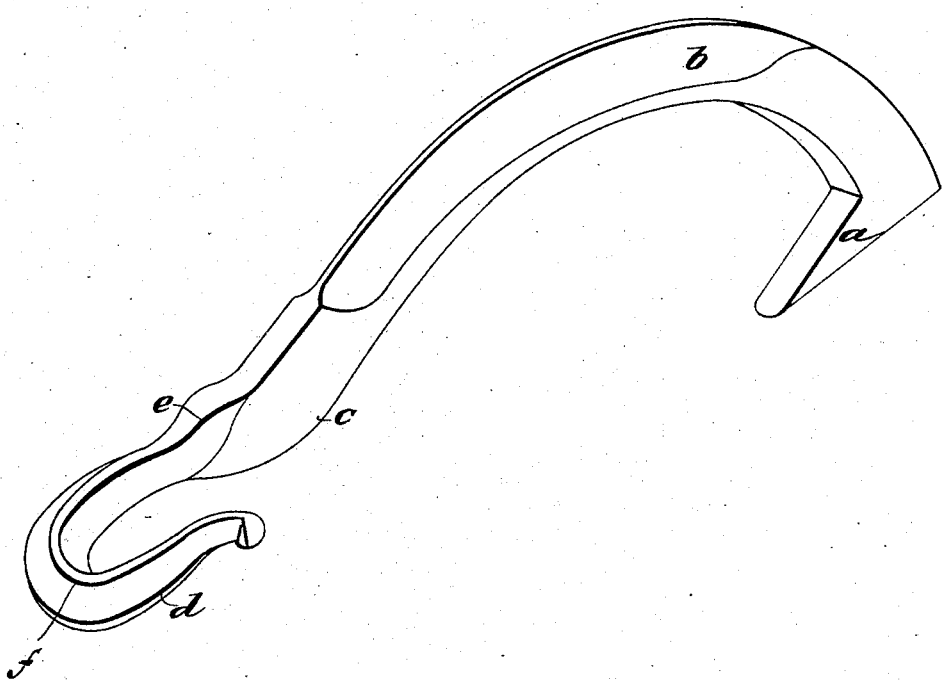
WITNESSES:
Francis McArdle.
C. Sedgwick
INVENTOR:
A. M. Millard
BY Munn & Co
ATTORNEYS.

UNITED STATES PATENT OFFICE.

ALBERT M. MILLARD, OF WAUSAU, WISCONSIN.

SWAMP AND GRAB HOOK.

SPECIFICATION forming part of Letters Patent No. 290,785, dated December 25, 1883.

Application filed October 12, 1883. (Model.)

*To all whom it may concern:*

Be it known that I, ALBERT M. MILLARD, of Wausau, Marathon county, Wisconsin, have invented a new and Improved Swamp and Grab Hook, of which the following is a full, clear, and exact description.

My invention consists of an improved construction of the hook employed for rolling logs onto crotches in the lumber-forests, and also for grabbing and pulling chains, skids, and other objects, the hook being connected to a chain hitched to a team, or to be pulled by the hands of men, as hereinafter fully described.

Reference is to be had to the accompanying drawing, forming part of this specification, in which the figure represents my improved hook in perspective view.

$a$ represents the swamp and grab hook, formed in the end of the strong curved steel shank $b$, suitably for hooking into the side of a log, well down at the back, from the direction in which the log is to be rolled, while the shank bears against the side of the log above the hook, touching at the part $c$ of the shank, or thereabout, above which is the hitching-hook $d$, the bend of which turns in a plane at right angles to that of hook $a$, so as not to bear on the log, to make it easy for hooking on the chain or the hook of a rope, by which the power is to be applied, and in order that the draft of hook $b$ will be in the line of the shank $b$ the shank of the hook is bent at $e$ reversely to the bend $f$, so that the center of the bend at $f$ is in the line of the shank $b$, thus preventing the hook from pulling sidewise, as it would if hook $d$ were bent wholly to one side of shank $b$.

Having thus described my invention, I claim as new and desire to secure by Letters Patent—

The improved swamp and grab hook, consisting of the curved shank $b$, having hook $a$, formed on one end in the plane of the bend of said shank, and the hook $d$, formed on the other end in a plane at a right angle to the plane of hook $a$, and also having a reverse bend, $e$, making the center of bend $f$ in the line of the shank $b$, substantially as described.

ALBERT M. MILLARD.

Witnesses:
A. H. GROUT,
J. H. JOICE.